(No Model.)
J. P. FABER.
TOP PROP FOR CARRIAGES.
No. 430,995. Patented June 24, 1890.
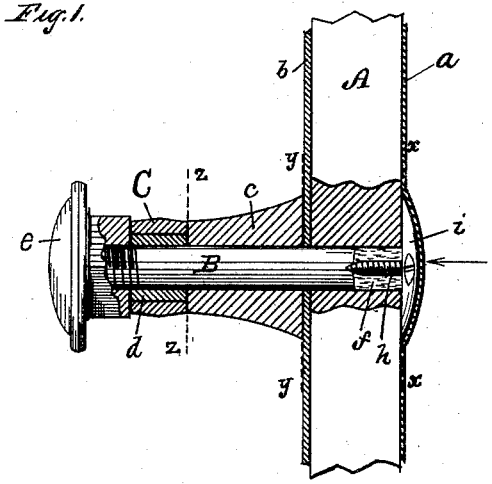
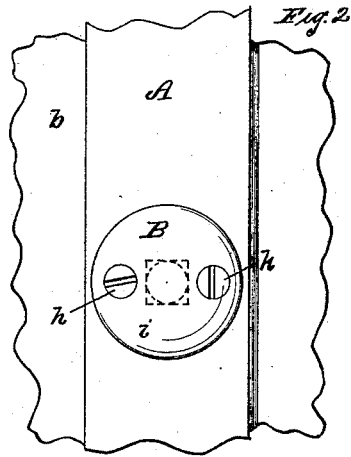
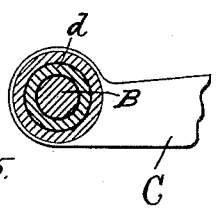
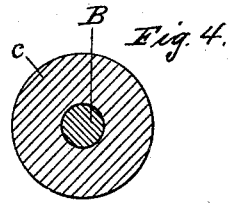
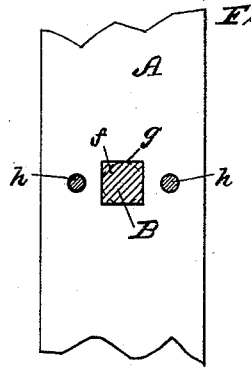
Attest:
M. L. McDermott,
John H. Hopkins.
Inventor.
John Peter Faber,
By E. B. Whitmore, Atty.

UNITED STATES PATENT OFFICE.

JOHN PETER FABER, OF ROCHESTER, NEW YORK, ASSIGNOR TO ALICE FABER, OF SAME PLACE.

TOP-PROP FOR CARRIAGES.

SPECIFICATION forming part of Letters Patent No. 430,995, dated June 24, 1890.

Application filed March 4, 1890. Serial No. 342,574. (No model.)

*To all whom it may concern:*

Be it known that I, JOHN PETER FABER, of Rochester, in the county of Monroe and State of New York, have invented a new and useful Improvement in Top-Props for Carriages, which improvement is fully set forth in the following specification and shown in the accompanying drawings.

The object of my invention is to produce a top-prop for what is known as "first-class work" that can be made at less expense than those for best work heretofore made, the invention being hereinafter fully described, and more particularly pointed out in the claim.

Referring to the drawings, Figure 1 is a side sectional elevation of my improved prop; and Fig. 2, a view at the inside, the lining being omitted. Fig. 3 is a transverse vertical section on the dotted line $x\ x$ in Fig. 1; Fig. 4, a section on the dotted line $y\ y$; Fig. 5, a section on the dotted line $z\ z$, all the figures from 2 to 5, inclusive, being seen as indicated by arrow in Fig. 1.

Referring to the parts shown in the drawings, A is the bow of the carriage-top, B the bolt of the prop, and C the joint or brace end.

$a$ is the inside lining; $b$, the leather cover; $c$, the thimble; $d$, the bushing, and $e$ the nut. The bolt is formed with a broad thin head $i$, lenticular in form and rigid, said bolt being passed through the bow from the inside of the latter, the head of the bolt resting against the inner surface of the bow. The bolt is formed with a square part $f$ under the head, which fits in a square opening $g$ in the bow, (shown in Fig. 3,) the hole in the bow from said square part to the outer surface being round. Fastening-screws $h\ h$ are put through the head of the bolt into the bow, which screws serve to hold the bolt firmly to the bow as against a torsional stress resulting from the action of the brace or from turning the nut $e$. These screws also hold the bolt firmly to place as against an end pressure or blow from without. The thimble $c$ is made solid—that is to say, it is made to closely fit the bolt throughout the length of the former. The bushing $d$ is formed in one piece, usually of brass, cylindrical in form, and separate from the thimble, the brace end having a cylindrical opening in which to receive the thimble. The nut $e$, which is of common construction, is threaded on the outer end of the bolt, as shown, and when tightened up presses the bushing firmly against the end of the thimble. The head of the brace end that receives the bushing is made a trifle shorter than the bushing, so as to turn with moderate friction between the nut and the thimble upon the bushing. When the nut is screwed up or tightened upon the bolt, it firmly presses or pinches the bushing, the thimble, the leather covering, and the bow between it and the head $i$ of the bolt. In this construction of the prop there is but one screw-thread necessary for the bolt, that being at the outer end to receive the nut, which also serves to render the prop as a whole inexpensive to manufacture.

What I claim as my invention is—

In a carriage-top prop, the combination, with a bow having a perforation therethrough, the inner portion of which is angular and the outer portion is round, of a bolt in the perforation, having a broad thin lenticular head provided with perforations and an angular portion under its head to fit in the angular portion of the perforation to prevent rotation of the bolt, the remaining portion of the bolt being round and having screw-threads upon its extreme outer end only, screws through the head of the bolt into the bow, a thimble on the bolt outside of the bow, a cylindrical bushing at the outer end of the thimble, a brace end on the bushing, and a nut upon the screw-threaded portion of the bolt, bearing against the outer end of the bushing and forcing it against the end of the thimble, substantially as described.

In witness whereof I have hereunto set my hand, this 24th day of February, 1890, in the presence of two subscribing witnesses.

JOHN PETER FABER.

Witnesses:
E. B. WHITMORE,
M. L. MCDERMOTT.